Dec. 5, 1950 J. JOHNSON 2,532,501
MOLDING OF PLASTICS
Filed Nov. 23, 1944 4 Sheets-Sheet 1

JOHN JOHNSON
INVENTOR
by his attorneys
Stebbins, Blenko & Webb

Dec. 5, 1950     J. JOHNSON     2,532,501
MOLDING OF PLASTICS
Filed Nov. 23, 1944     4 Sheets-Sheet 4

JOHN JOHNSON
INVENTOR
by his attorneys
Stebbins, Blenko & Webb

Patented Dec. 5, 1950

2,532,501

UNITED STATES PATENT OFFICE 2,532,501

MOLDING OF PLASTICS

John Johnson, Slough, England, assignor to Combined Optical Industries Limited, Slough, England, a British company Application November 23, 1944, Serial No. 564,795
In Great Britain January 27, 1944

13 Claims. (Cl. 18—17)

This invention relates to an improved method of and apparatus for the moulding of plastics. It is particularly intended for the moulding of optical elements such as lenses from transparent thermoplastic material, although it is applicable to the moulding of other articles, particularly those requiring great precision in the moulding thereof.

An object of the invention is the provision of moulding apparatus of considerable precision and speed of operation in which the heating of the blank and moulding of the article therefrom are largely automatic, so that much less expert supervision of such operations is required than formerly. Another object is the provision of a process of moulding articles from thermoplastic material, for the carrying out of which the apparatus referred to is well adapted, in which the blank to be moulded is heated to moulding temperature while between the dies, the heat supply is cut off, and cooling and moulding pressure are applied simultaneously, the rate of cooling being properly calculated to permit the moulding to be effected before the material of the article sets. Other objects of the invention comprise the provision of improved combinations and arrangements of parts of apparatus and steps of process, as will be more fully described hereafter.

In accordance with the invention, a blank to be moulded is placed between opposed dies (or between a die and a support, if one face only is to be moulded); thermostatically - controlled means are then operable when and if the dies and blank are at a predetermined moulding temperature, this means serving automatically to apply moulding pressure to the blank. Preferably, the blank is placed in unheated condition between the dies, which are brought into light contact therewith. Heat is then switched on to heat the blank through the dies (or through a die), and the various required operations follow automatically; that is to say, the heat is switched off when the blank attains moulding temperature, moulding pressure is applied and means for cooling the blank through the dies are applied; pressure is maintained upon the blank until it has cooled to a predetermined temperature at which the moulded product has sufficiently set, at which time the pressure is released and the dies opened. Also preferably, and when performing operations in which the method referred to above is applicable, the application of moulding pressure and the positioning of heat abstracting means into co-operative relation to the dies and blank are simultaneous, the article which is being moulded thus starting to cool, at a properly calculated rate, at the same time that the full pressure is applied.

With the operations referred to it is only necessary, when starting the mass production of a particular lens or other product, to determine experimentally two temperatures which may vary with different materials and types of article moulded, and one time element. These are (1) the best moulding temperature, (2) the temperature at which the product has been sufficiently cooled and set to enable it to be taken from the press, and (3) the time required for the blank, heated through the dies and socket members for the dies, to attain the temperature earlier attained by the latter. Suitable adjustments are then made which will hold good for all following operations on the same article made from the same material, with the result that moulded precision articles can be turned out with less expert supervision and greater rapidity than heretofore.

In order that the invention may be more easily understood, attention is hereby directed to the accompanying drawings, forming part of this application and illustrating certain embodiments of the invention.

Referring to the drawings.

Figure 1:
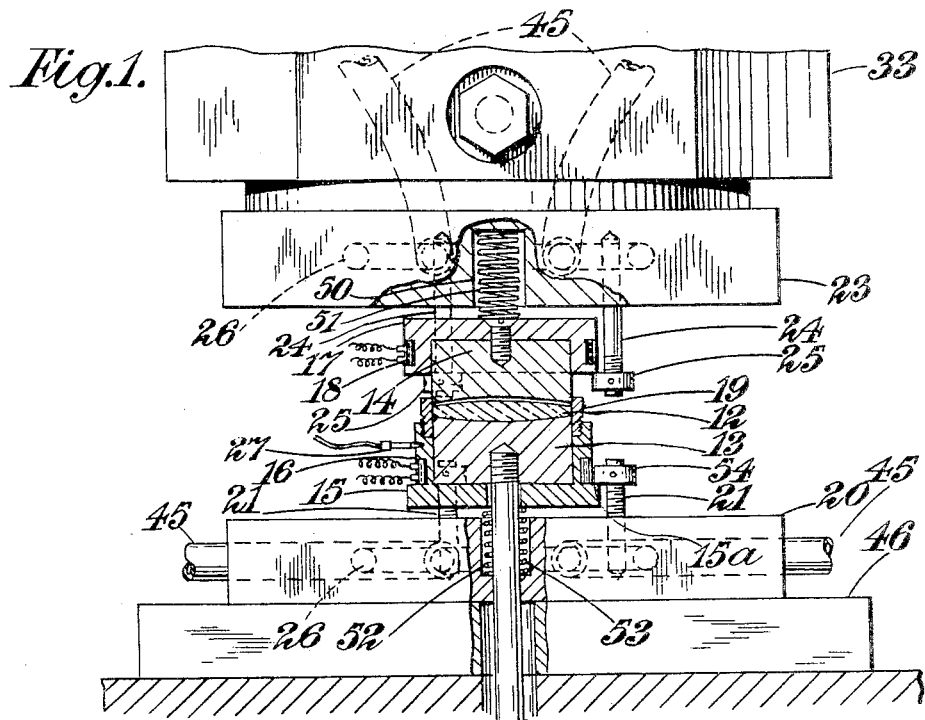
Fig. 1 is a view, partly in section and partly in elevation, of a part of a mould for making a lens from a preformed blank of plastic.

Referring first to Fig. 1, the pre-formed blank, 12, formed of a transparent plastic, such as methyl methacrylate polymer or polystyrene, is shown as positioned between the lower and upper dies, 13, 14, both of which are shown with concave inner surfaces and flat outer surfaces. The said dies are mounted in lower and upper socket members, 15 and 17, which are provided with electric heating elements 16, 18, so that these socket members may be referred to as heating members for the dies mounted therein. The surround, 19, is shown as screwed into the upstanding flange of the lower socket member, 15; this surrounds the blank, 12, and closely surrounds the lower portion of the upper die, 14, for which it serves as a guide, the dies as illustrated being circular in plan.

Lower and upper cooling blocks, 20, 23, are provided, these being metal blocks designed to abstract heat from the dies and blank, through the intermediary of the socket members, 15, 17, when brought into contact therewith at suitable times, as will be described later. These blocks may, if desired, be provided with conduits, 26, 26, for the circulation of cooling water therethrough. The top cooling block, 23, is mounted on carrier 33 of the upper movable portion of the press, while the lower cooling block, 20, is mounted on a bedplate, 46, at the top of the base 40 (shown in Fig. 3).

The cooling blocks and the adjacent socket members or heating members are normally spaced apart, and are movable relatively to each other into contact, when full moulding pressure is to be applied and the dies and blank are to have cooling effect applied thereto. Accordingly, the lower socket member, 15, is held resiliently raised above cooling block, 20, as by means of the spiral spring, 53, mounted in a central opening, 52, in cooling block, 20, and shown as surrounding the ejection rod, 49, this spring pressing against the lower surface of the lower socket member, 15. The latter may be surrounded by three pins, 21, having adjustable heads, 54, which engage and guide the upstanding flange of socket member, 15. The lower surfaces of these heads also engage the top surface of the horizontal flange, 15a, of the socket member, outside the upstanding flange, when pressure is not being applied, to limit the upward movement of the socket member, 15, under the effect of spring, 53.

Correspondingly, the upper socket member, 17, is normally held spaced apart from the upper cooling block, 23, above it, the socket member being suspended from block, 23, by means of pins, 24, spaced around it, extending downwardly from block, 23, and having adjustable heads, 25, on which this socket member rests, until the moulding pressure comes on. These pins may also serve to guide the socket member in its vertical movements. The block, 23, may be provided, as shown, with a central vertically-extending opening, 50, housing a spiral spring, 51, which engages with the top of the upper socket member, 17, so as to prevent any possible sticking of the socket member on pins, 24, thus ensuring that the socket member normally will be separated from block, 23, as far as the heads, 25, of pins, 24, permit.

Figure 3:
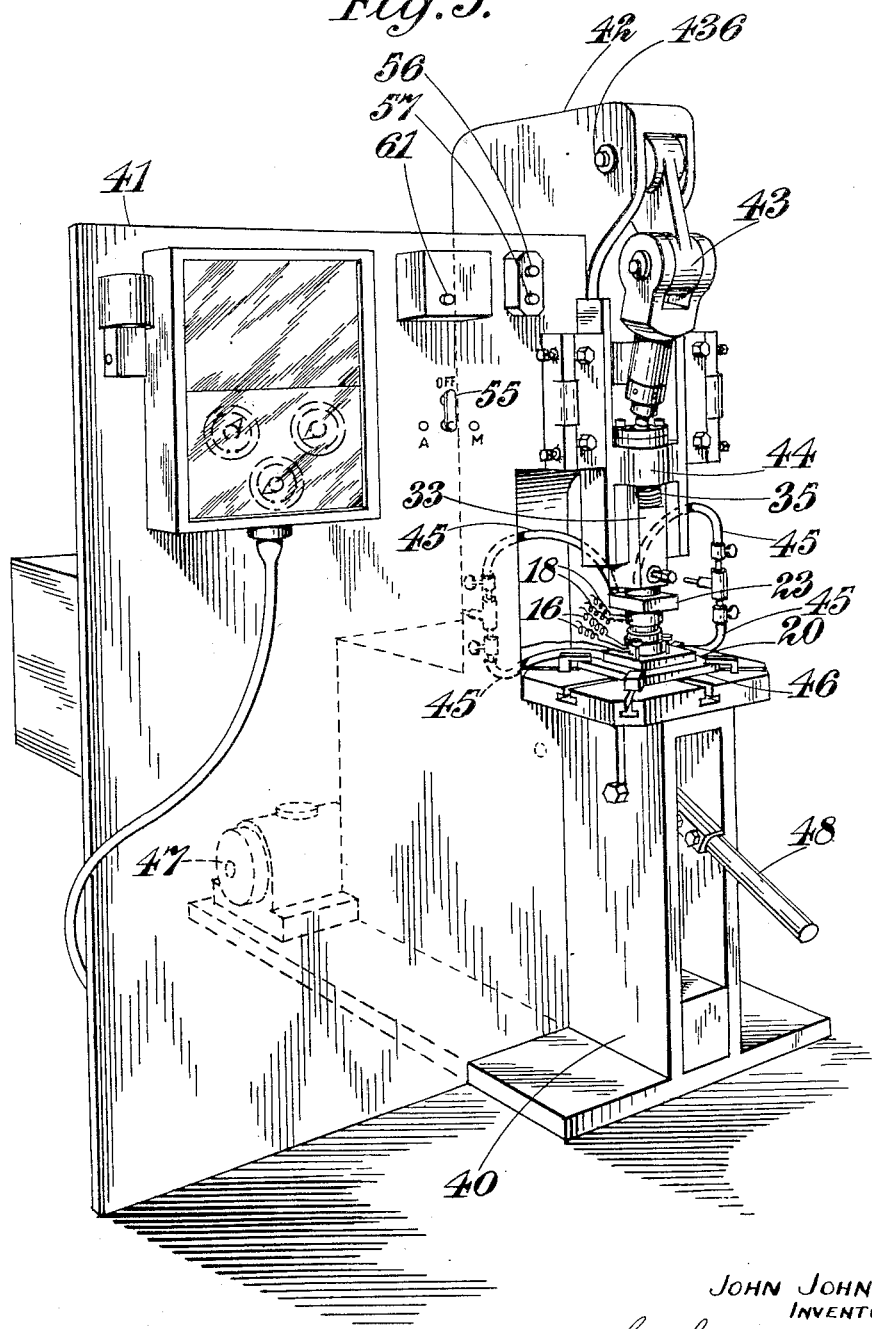
Fig. 3 is a perspective view of one form of the complete moulding apparatus.
Figure 4:
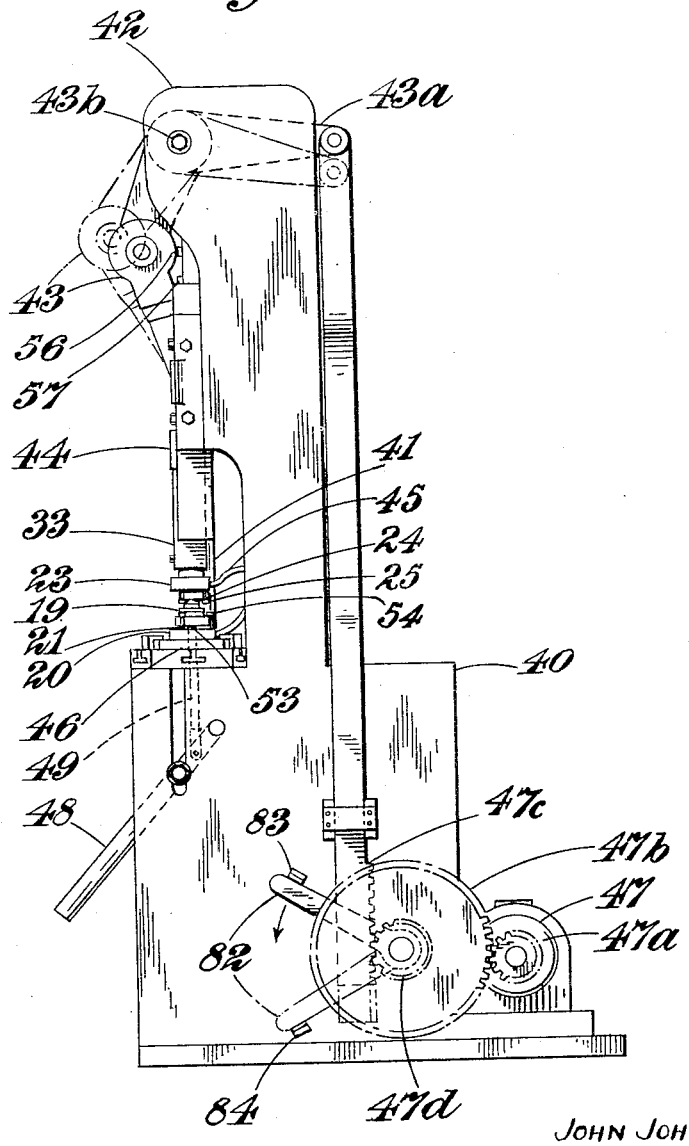
Fig. 4 is a side elevation of the apparatus shown in Fig. 3.

Referring to Fig. 3, 40 is a base and 41 is an upright panel rigidly secured thereto. A powerful toggle, 43, mounted in the upper part of the frame, 42, is arranged to exert pressure on a cross head, 44, which is connected to the carrier, 33, of the upper cooling block, 23, through a powerful spiral spring, 35. Pipes, 45, are arranged to carry cooling water to the conduits, 26, in the two cooling blocks, 20 and 23, and the lower cooling block, 23, is detachably mounted on a bedplate, 46, at the top of the base, 40. A motor, 47, is coupled to the toggle, 43, to effect the movements of the upper cooling block, 23, at the proper times, as by means of gears, 47a, and 47b, rack, 47c, pinion, 47d, and arm, 43a, pivoted to the top of the rack bar at one end and mounted for partial rotation at its other end upon the shaft, 43b, upon which the upper arm of the toggle, to which it is rigidly connected, is also rotatably mounted, as is shown in Fig. 4.

The operation, so far as the parts have been described, is as follows: The dies, and the cold preformed blank, are carefully cleaned, the blank is laid on the lower die, and the upper die is lowered (by hand control) until the upper die just touches the blank, the dies being in close contact with their respective socket members, but both socket members being spaced away from the cooling blocks. The blank is preformed to give it a curvature very nearly that of the finished lens, so that only a comparatively small change of shape of the plastic blank will have to be effected by the moulding operation. The operator will see very readily when the upper die has been brought into light contact with the blank, because the springs, 51, and 53, will then yield slightly. Or, if desired, an electrical stop device may be used, to prevent the upper block, 23, from being lowered too far at this time.

Both dies being now in light contact with the blank, current is automatically turned on to heating coils, 16, and 18, and the socket members, dies, and blank are all heated. When the dies and blank have reached the correct temperature for moulding, as predetermined for each case, the heating current is turned off, automatically, by thermostat action. At the same time, the mounting pressure is automatically applied by the operation of toggle, 43, this bringing the top cooling block, 23, down into contact with the top socket member, 17, the same movement forcing the lower socket member, 15, into contact with the bottom cooling block, 20. Moulding pressure is thus transmitted to the blank through the upper cooling block, socket member, and die, and results in the final moulding of the surfaces of the blank being effected to form an optically accurate lens. While the moulding is being effected, heat is continuously abstracted from the blank and the dies, being conducted from the latter, through the two socket members, to the two cooling blocks.

Cooling of the article which is being moulded thus, in the form of apparatus illustrated, starts simultaneously with the moulding. The upper die maintains moulding contact with the blank during the shrinkage of the latter as it cools, the necessary follow-up pressure being provided by the spring, 35, shown in Fig. 3. When the moulded article has sufficiently cooled and set, to the predetermined temperature at which it should be removed from the press, the upstroke of the press is effected automatically, under the control of thermostatic means, the upper cooling block, socket member, and die being raised to their uppermost positions, with the upper cooling block and socket member, and also the lower cooling block and socket member, out of contact with each other. The finished lens may now be removed from the apparatus, and this may readily be effected by means of the handle, 48, provided in the base, 40, shown in Figs. 3 and 4, and operatively connected to the vertical ejection rod, 49, shown in Figs. 1 and 4.

Figure 2:
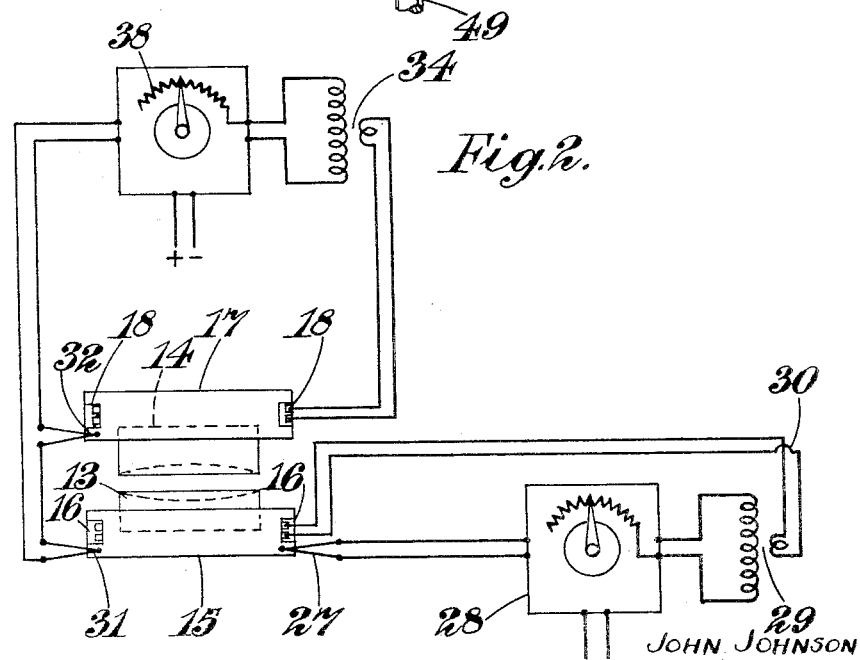
Fig. 2 is a partial electric current diagram indicating thermostatic controls for the moulding operation, and connections therefor.

One method of cutting off the heating current for the coils, 16, 18, when the socket members reach a predetermined temperature, such that the blank is at proper moulding temperature, is indicated in Fig. 2. As there shown, the thermocouple, 27, is positioned in the lower socket member, 15, and arranged to control a potentiometer and switch, indicated at 28. This latter is on the input side of current transformer, 29, the output, 30, of which is in circuit with the heating element, 16, which heats the lower socket members. The thermo-couple is set to cut off the current when the temperature of the lower socket member rises to a predetermined figure. Two thermo-couples 31 and 32 of a different thermostat are positioned in socket members 15, and 17, respectively. The differential thermostat is coupled to a potentiometer and switch, 38, the output side of a current transformer, 34, the output of which is in circuit with the heating element, 18, in socket member 17, so that the latter is always kept at the same temperature as socket member 15.

Figure 5:
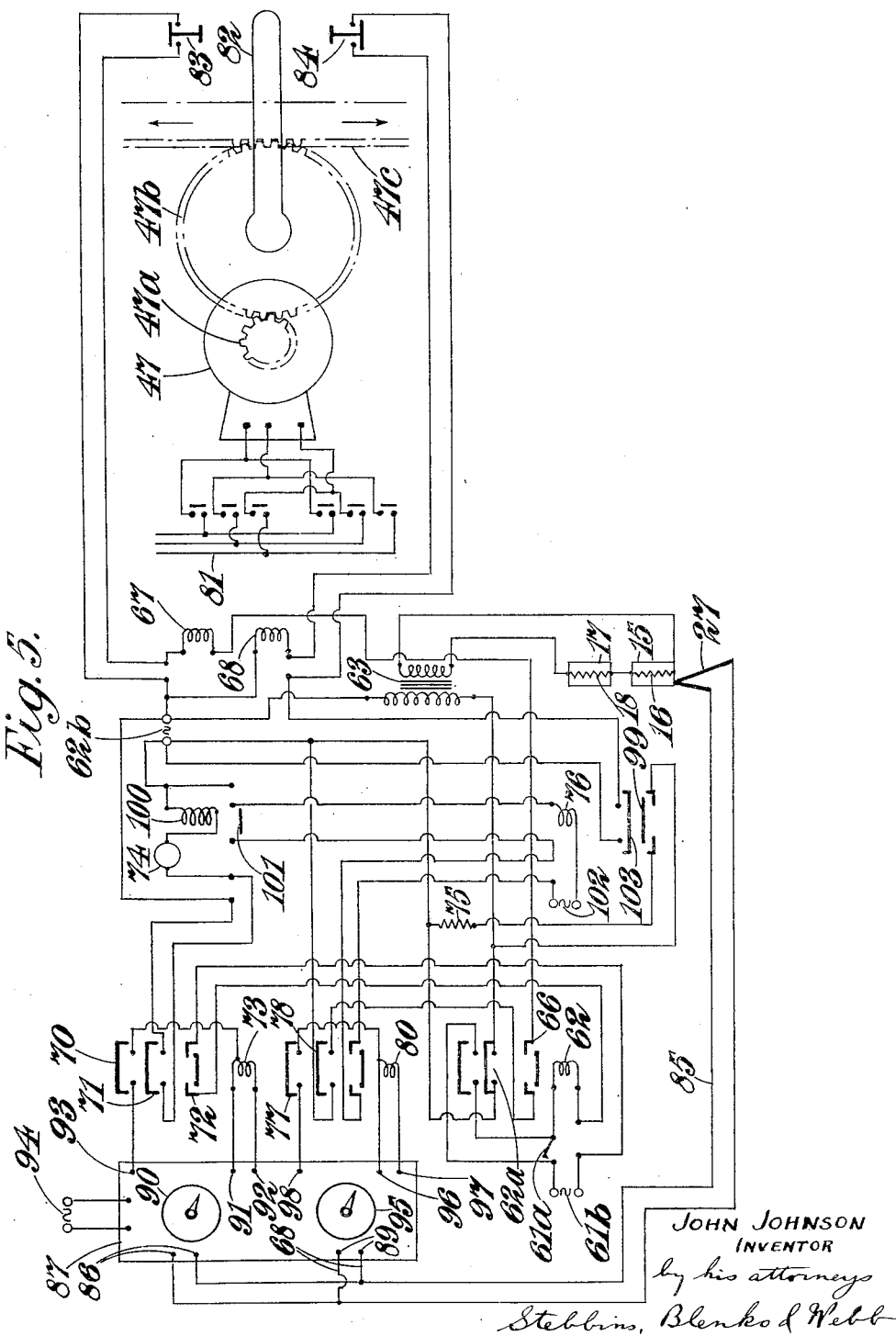
Fig. 5 is a complete circuit diagram for the control of the apparatus, including thermostatic control somewhat different from that shown in Fig. 2.

Complete circuit connections for the press are indicated in Fig. 5, in which a somewhat different method of thermostatic control from that just described in connection with Fig. 2 is indicated. To now describe the operation in connection therewith, it should first be noted that a three-way switch, 55, is mounted on panel 41, as shown in Fig. 3, this having three positions, "A" for "automatic," "M" for "manual," and "Off." The operation of the press under manual control is in accordance with known practice, and the connections therefor will not be shown or described herein.

When the prepared blank, 12, is placed between the upper and lower dies, 14, 13, the switch, 55, is turned to the position marked "M." The push buttons, 56, 57, shown in Fig. 3, control manually the up and down strokes of the upper die, and, as stated above, the upper die is first brought down into light contact with the blank, a pressure of only a few pounds being thus applied to the blank. The starter button, 61, (Figs. 3 and 5) is now operated, and the control switch is changed over to "A" for automatic operation.

The pressing of button, 61, closes the push-button switch, 61A, and thereby closes the circuit of an electric relay, 62, this circuit passing through the terminals, 72, of relay, 73, these terminals being closed at the time, relay coil, 73, not being energized. The power connection for the circuit is indicated at 61b. The energizing of relay, 62, closes the circuit of the primary of a transformer, 63, the secondary of which supplies current to both the bottom and top heating units, 16, and 18, of the socket members, 15, and 17. The primary circuit of this transformer passes through terminals, 62a, of relay, 62, which are closed when this relay is energized, and is connected to the power mains as is indicated at 62b. The voltage used for the heating circuit should be adjusted for the size of dies which are to be used. For dies of 2 inch to 4 inch diameter, 30 volts and 600 watts per heater is suitable.

Another effect of operating relay, 62, is to break the circuit of relay, 67, which controls the up-stroke of the upper die, as will be described hereinafter. This circuit extends from the power mains connection, 62b, and passes through the terminals, 66, of relay, 62, which are closed while the relay coil, 62, is de-energized, and are accordingly opened by its energization, this circuit also passing through the terminals, 78, of relay, 80, which are closed when this relay is energized, as it is at this time. Relay, 80, it may here be remarked, was actuated on the preceding operation when the dies, socket members, and blank had cooled and the blank set sufficiently for the blank to be removed, and it remains energized until the temperature of the socket members rises above this temperature. At the beginning of the following operation, here described, the socket members are still below the temperature at which relay, 80, will be de-energized, and therefore placing the press on automatic operation would result in raising the press, if it were not for the opening of the circuit of relay, 67, at 66, as just described. The result of this is that the upper die is prevented from moving upwardly from its position of light contact with the blank until relay, 67, is again energized.

The press control circuit may be referred to briefly at this point. The up-stroke relay, 67, in the specific embodiment of the invention illustrated, operates a three-phase contactor, 81, which causes the motor, 47, to rotate in a clockwise direction, thus causing the cross-head, 44, and connected movable parts of the press to move upwards, by means of the gear and rack and pinion connections described. This upward movement continues until the bar, 82, mounted to rotate with pinion, 47b, strikes the limit switch, 83, thus breaking the circuit of the coil, 67, and stopping further movement of the press. The downstroke coil, 68, correspondingly operates the contactor, 81, in a counter-clockwise direction, and causes the press to downstroke; this movement is limited by the striking of bar, 82, against the limit switch, 84.

The press remains in its described position, in which the blank is lightly contacted by the two dies, until the socket members, 15 and 17, have been heated up to a predetermined temperature, as registered by the thermo-couple, 27, which is placed in the lower socket member 15, as previously described. The result of this is to energize the relay, 73, and to thereby de-energize relay, 62, as will now be described.

The thermo-couple, 27, is connected to two potentiometer circuits, namely, by connections, 85, to terminals, 86, on the casing of the potentiometer, 87, and by connections, 85, 88, to the terminals, 89, on the said casing, the two circuits referred to, connected respectively with the terminals, 86, and 89, being inside the said casing, and not shown. The apparatus referred to is well known, and its details accordingly are not described or illustrated. The first potentiometer circuit, connected with terminals, 86, energizes the relay, 73, when the temperature rises above the reading set on the dial, 90, of the first potentiometer, the circuit then being closed by a switch in the potentiometer mechanism, through terminals, 91, 92, of the potentiometer, to the coil, 73. Terminals, 70, of coil, 73, are thereby closed, to establish a holding circuit through coil, 73, and terminals, 93 and 92 of the potentiometer, to maintain the coil, 73, in energized condition. Relay, 73, will be de-energized when the temperature determined by thermo-couple, 27, falls below the reading set on the dial, 90. Energy for the potentiometer circuits is taken off the mains as indicated at 94.

The second potentiometer energizes relay, 80, in similar fashion, when the temperature in socket member, 15, falls below the reading on dial, 95, when the moulded lens has set sufficiently to be removed from the press. In this case the circuit for energizing relay coil, 80, is completed through terminals, 96, 97, of the second potentiometer, a holding circuit for this coil then being established through terminal, 98, of the potentiometer, and the terminals, 77, of coil 80. Relay, 80, will be de-energized by the potentiometer when the temperature in the socket members rises above the reading set on dial, 95.

When relay, 73, is energized, relay, 62, is de-energized, as stated above, its circuit being broken by the opening of terminals, 72, of relay, 73, consequent upon the energizing of this relay. Terminals, 71, of relay, 73, are closed at the same time, which completes the circuit for time switch, 74, to the power connection, 62b. The de-energizing of relay, 62, breaks the circuit of the primary of transformer, 63, by the opening of terminals, 62a, of relay, 62, but a new energizing circuit for this transformer primary is immediately established through a shunt, 75, across the terminals, 62a, this shunt extending through the terminals, 99, of relay, 76, these terminals being closed while relay, 76, is de-energized. Accordingly, heating current for heating coils, 16, and 18, in socket members, 15, and 17, will continue to be supplied from the secondary of transformer, 63, at a constant rate, for a time which is set on the time switch, 74. The object of this provision is to provide heat to the socket members for a determined length of time after socket member, 15, has attained the temperature set on dial, 90, so that the blank, 12, whose temperature rise lags slightly behind that of the socket members, shall attain the predetermined moulding temperature.

At the end of the time set on the time switch, 74, the latter closes a circuit which energizes relay coil, 100, thereby closing the terminals 101, of this coil, which, as shown, remain open so long as this coil remains de-energized. The time switch is a well known mechanism, and therefore is only indicated conventionally. The closing of terminals, 101, completes the circuit of the relay coil, 76, this circuit passing through terminals, 79, of relay, 80, which are closed, relay, 80, being de-energized. Energy for this circuit is supplied from the connection to mains, 102. The energizing of coil, 76, opens the terminals, 99, of this coil, and thereby opens the shunt circuit, 75, by which the primary of transformer, 63, was supplied, so that the supply of heat to coils, 16, 18, in the socket members is cut off. The operation of relay, 76, by closing its terminals, 103, also closes the circuit of relay, 68, which operates the down-stroke of the press, as previously described. The cooling blocks, 23, and 29, are thereby pressed firmly against the socket members, 17, and 15, and the full moulding pressure is then applied to the blank, 12, through the intermediary of the cooling blocks, socket members, and dies. Suitable moulding pressure is found to be two tons per square inch when the blank is formed of methyl methacrylate polymer, or one ton per square inch when the blank is polystyrene.

The press then remains in this position until the moulded lens has cooled and set to the predetermined temperature at which it can be removed. At this time the thermo-couple, 27, operates relay, 80, as previously described. This opens the terminals, 79, of this relay, and thereby de-energizes relay, 76, so that the circuit for the down-stroke, 68, is broken. The operation of relay, 80, also closes its terminals, 78, and thereby switches on the circuit of upstroke relay, 67, which circuit is completed through terminals, 66, of relay, 62, which latter relay was de-energized by the operation of relay, 73, at the time when the temperature of the socket members rose above the reading set on dial, 90, as previously explained. The press therefore moves upward to its uppermost position, determined by upstroke limit switch, 83. The de-energizing of relay, 76, also, by closing its terminals, 99, again, connects the shunt, 75, across the terminals, 62a, and the press, after the removal of the finished moulded lens, is ready for another operation.

It will be observed that the described apparatus permits the practising of a method whereby the blank is heated, between opposing dies, to moulding temperature whereupon the supply of heat is cut off, and simultaneously moulding pressure is applied and cooling of the blank is instituted, the pressure and cooling being continued until the moulding is complete and the finished article has set. For this operation, it is necessary to calculate and provide such a rate of cooling that the moulding will be completed before the article sets. This can readily be done by providing for abstraction of heat from the socket members by cooling blocks, and dissipation thereof, at a suitable rate, as by means of a suitably calculated cooling water system therefor.

What I claim is:

1. In moulding apparatus, the combination of a support for a blank to be moulded, an upper press member reciprocable above the same, a cooling member carried thereby, cooling means in said cooling member, a heating member carried by said cooling member below the same, normally spaced therefrom and movable relatively thereto, means for supplying heat to the heating member at required times, and a die member carried by said heating member below the same, said parts being adapted for the lowering of said die member into light contact with the blank leaving the cooling member spaced from the heating member during the heating of the die member and blank, further downward movement of said press member thereafter causing relative movement between said cooling and heating members to cause contact therebetween and direct transmission of pressure through the same and said die member to the blank.

2. In moulding apparatus, the combination of upper and lower dies, heating members secured to the outer surfaces thereof, cooling blocks mounted in alignment with said members, above the upper and below the lower of the same, means for cooling said cooling blocks, resilient means for holding the lower of said members spaced away from the block below it, the upper one of said members being slidably supported below said upper block and normally spaced therefrom, means for heating said members when required, and means actuating one of said blocks and the adjacent member for causing relative movement between said dies to apply light pressure to a workpiece therebetween during heating thereof and thereafter to cause relative movement between said members and adjacent blocks into contact with each other and to transmit moulding pressure directly therethrough to the workpiece.

3. In moulding apparatus, the combination of opposed dies, a heating member secured to the outer surface of one of the same, a cooling block mounted in alignment with said member and normally spaced from the outer surface thereof and movable relatively thereto, means for cooling said block means for heating said member when required, yieldable means interposed between said block and member, and means for causing relative movement between said dies and applying light pressure through said block, yieldable means and member to apply initial pressure to a workpiece between said dies while leaving said member and block spaced apart, and for thereafter applying greater pressure upon said block to cause said block to come into contact with said member against the resistance of said yieldable means, to transmit moulding pressure to said workpiece through said block and member.

4. In moulding apparatus, the combination of opposed die members, means for causing relative movement therebetween to cause light contact thereof with a blank therebetween, means for applying heat to the die members, means for discontinuing the application of heat when the blank has attained moulding temperature, and means controlled by said last-mentioned means for causing further relative movement between said die members to apply moulding pressure to the blank.

5. In moulding apparatus, the combination of opposed dies, a heating member for one of the same, a cooling member, means for causing relative movement between said dies to cause light contact thereof with a blank therebetween, means for applying heat through said heating member and die to the blank, means for switching off said heat when the blank has attained moulding temperature, and means controlled by said last-mentioned means for moving said cooling member into heat conductive relation to one of said dies, and for applying moulding pressure through one of said dies to the blank.

6. In moulding apparatus, the combination of opposed dies, a heating member secured to each of the same, cooling members, normally spaced apart from said heating members and movable relatively thereto to cause light contact thereof with a blank therebetween, means for applying heat to said heating members, means for switching off said heat when the blank has attained moulding temperature, and means controlled by said last-mentioned means for moving said cooling members into contact with said heating members, and for applying moulding pressure through one of said cooling members and dies to the blank.

7. In moulding apparatus, the combination of opposed dies adjustable to cause light contact thereof with a workpiece to be moulded therebetween, means for supplying heat to the dies and workpiece when in light contact, means for switching off said heat when moulding temperature has been attained, means controlled by the last-mentioned means for applying moulding pressure to the workpiece, and means responsive to the temperature of the dies for releasing such pressure when the moulded workpiece has cooled to a predetermined temperature.

8. In moulding apparatus, the combination of opposed die members, means for causing relative movement therebetween to cause contact thereof with a blank to be moulded therebetween, a thermostatic device, means for applying heat to one of said dies and to said blank and to said thermostatic device, and means actuated by said thermostatic device for disconnecting said heat-applying means and intiating further relative movement between said die members towards each other to apply moulded pressure to the blank when the blank has attained moulding temperature.

9. In moulding apparatus, the combination of opposed dies, a heating member for one of said dies, a cooling member normally spaced from one of said dies, and means for moving said dies towards one another to apply initial pressure to a workpiece between said dies during heating thereof, and for thereafter moving said cooling member into heat-conductive relation with one of said dies and for increasing the pressure applied through said dies to the work to a pressure suitable for moulding.

10. In moulding apparatus, the combination of opposed press members relatively movable towards and away from another, a pair of opposed dies located between said press members, a cooling block located between one of said dies and one of said press members, means for heating one of said dies and means for applying initial pressure to a workpiece between said dies while maintaining a space between said cooling block and said one of said dies during heating thereof and for thereafter pressing said die and cooling block into close contact and for transmitting moulding pressure to said die through said block.

11. A method of moulding articles from blanks of thermoplastic material comprising placing a cold blank between opposed dies, heating the dies and blank to moulding temperature and then cooling the dies at a rate calculated to permit the moulding of the article to be effected before the material thereof sets, and applying moulding pressure to the blank at the beginning of the cooling step and maintaining such pressure continuously until the moulded product has set.

12. In moulding apparatus, the combination of opposed dies mounted for relative movement towards and away from each other, thermostatically controlled means for heating said dies while containing a blank positioned therebetween to a predetermined moulding temperature, a time switch, means actuated by said thermostatically controlled means for actuating said time switch when said dies have attained said temperature, means controlled by said time switch for maintaining the supply of heat to said dies for a predetermined time thereafter, and means automatically operable after the expiration of said predetermined time to cause movement of said dies towards each other to apply moulding pressure to the blank.

13. In moulding apparatus, the combination of opposed dies, means for causing relative movement therebetween to cause contact thereof with a blank to be moulded therebetween, electrically-controlled means for supplying heat to said dies after such contact has been established and until said dies have attained moulding temperature, a time switch, a thermostatic device responsive to the temperature of said dies, means actuated by said thermostatic device for actuating said time switch when said dies have attained moulding temperature, means actuated by said time switch for continuing to supply heat to said dies for a predetermined time, and means controlled by said time switch for thereafter causing said dies to press more strongly against said blank to mould the same, for stopping such supply of heat to said die and for applying a cooling medium to said dies.

JOHN JOHNSON.

REFERENCES CITED

The following references are of record in the file of this patent:

UNITED STATES PATENTS

| Number | Name | Date |
| --- | --- | --- |
| 1,030,408 | Jegge | June 25, 1912 |
| 1,443,378 | Ordway | Jan. 30, 1923 |
| 1,871,406 | De Turk et al. | Aug. 9, 1932 |
| 2,015,855 | Kerr | Oct. 1, 1935 |
| 2,099,499 | Raney | Nov. 16, 1937 |
| 2,128,417 | Kerr | Aug. 30, 1938 |
| 2,289,524 | Smith et al. | July 14, 1942 |
| 2,314,838 | Kingston | Mar. 23, 1943 |
| 2,373,201 | Smith | Apr. 10, 1945 |
| 2,432,215 | Stocker | Dec. 9, 1947 |